Oct. 7, 1952 R. H. ARBIB 2,613,099
BUMPER GUARD STRUCTURE
Filed Dec. 11, 1948 2 SHEETS—SHEET 1
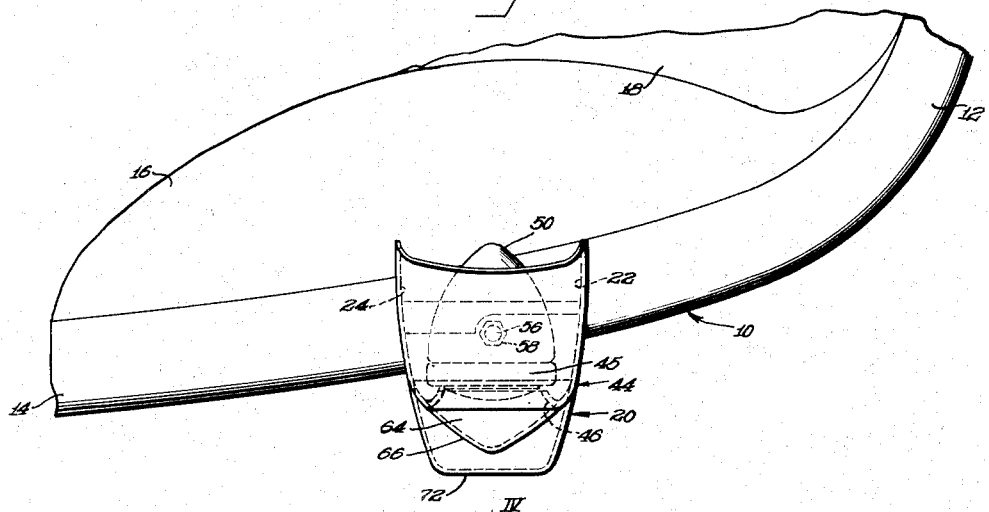
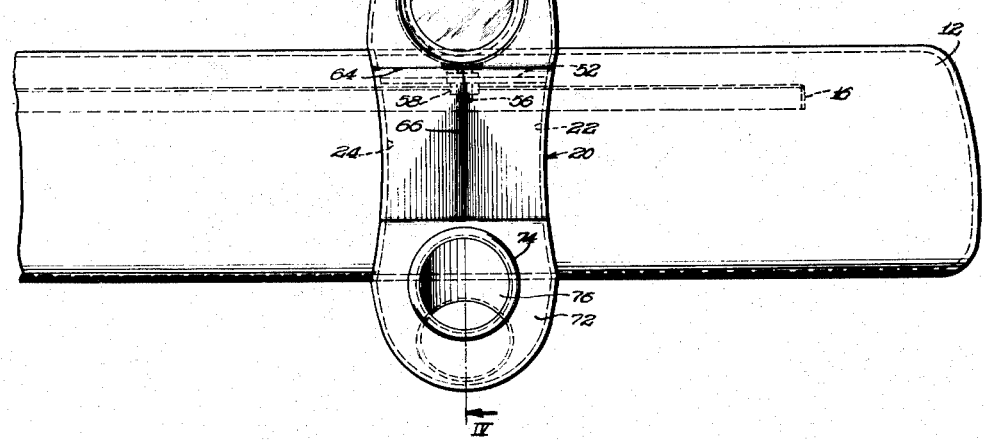
Inventor
Richard H. Arbib
By The Firm of Charles Hills Attys

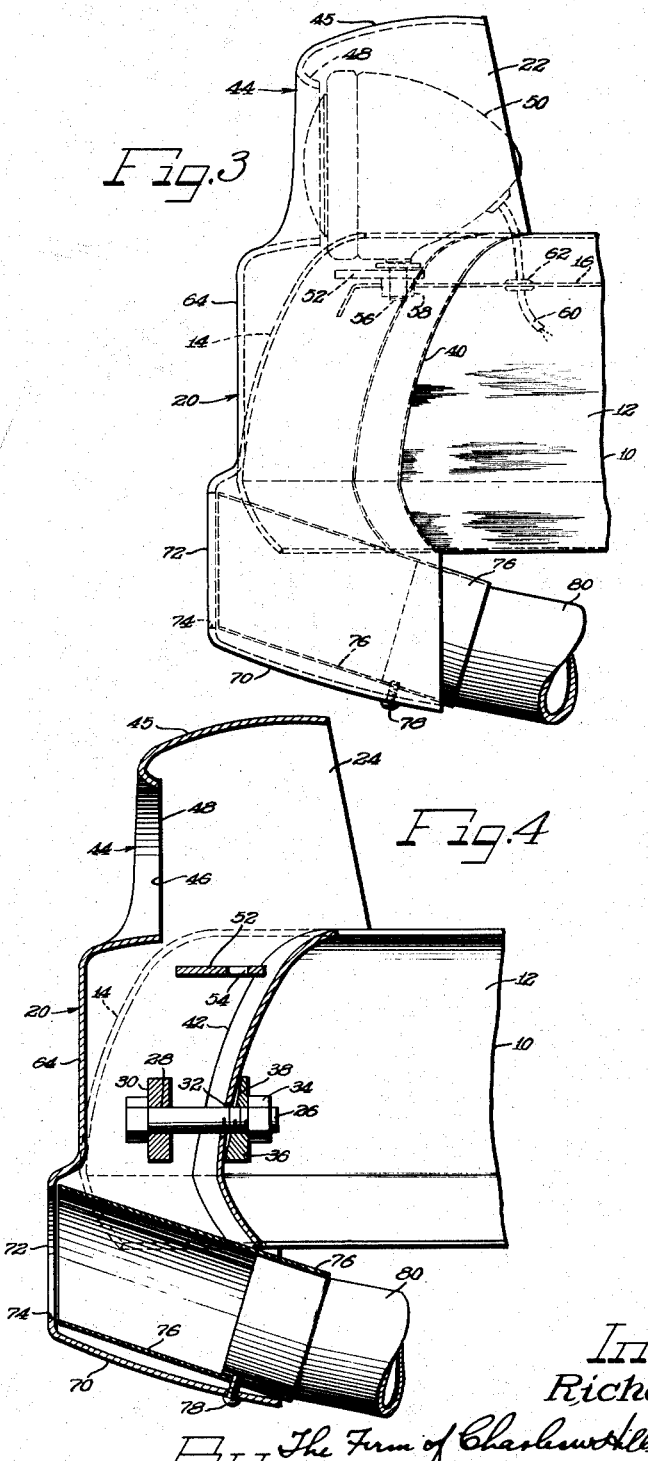

Patented Oct. 7, 1952

2,613,099

UNITED STATES PATENT OFFICE 2,613,099

BUMPER GUARD STRUCTURE

Richard H. Arbib, Grosse Pointe Woods, Mich., assignor to Houdaille-Hershey Corporation, Detroit, Mich., a corporation of Michigan Application December 11, 1948, Serial No. 64,771

7 Claims. (Cl. 293—65)

This invention relates to a novel bumper guard structure for use on automobiles and more particularly concerns a bumper guard for mounting on the rear bumper of an automobile.

In modern automobile design the current trend is toward long, unbroken lines of symmetry. However, accessories that must be mounted on the exterior of the automobile tend to disrupt the continuity of the design and it is therefore desirable to consolidate accessories as much as possible.

Further, it has been found advantageous to extend the exhaust pipe outlet to a point rearwardly of the bumper to prevent gases from the exhaust flowing upwardly around the bumper and discoloring the chrome or other finish thereof.

It is therefore an important object of the present invention to provide a bumper guard that not only protects the body of the automobile but has a novel, supporting cooperation with other accessories mounted at the rear of the automobile.

Another object of this invention is to provide a bumper guard having a plurality of functional openings therein providing outlet ports for accessories supported by said bumper guard.

A still further object of this invention is to provide a novel support means for the discharge end of an exhaust pipe.

Another and further object of the present invention is to provide a novel bumper guard having provision for mounting accessories both above and below the bumper to which it is attached.

Other and further objects, features and advantages of the present invention will become apparent to one skilled in the art from the following detailed description in the annexed sheets of drawings.

On the drawings:

Figure 1 is a fragmentary top plan view of a bumper guard, constructed according to the teachings of the present invention, mounted on the rear bumper of an automobile;

Figure 2 is a rear elevational view of the bumper guard of Figure 1;

Figure 3 is a fragmentary side elevational view of the bumper guard of Figures 1 and 2 showing in dotted lines the mounting of a plurality of accessories thereon;

Figure 4 is a vertical sectional view taken substantially on line IV—IV of Figure 2.

In the various views the reference numeral 10 indicates a rear bumper attached to an automobile (not shown). This bumper may be of conventional design having forwardly turned ends 12 and a rearwardly bulged central portion 14. A stone guard 16 is secured in a horizontal position between the bumper 10 and a rear body portion 18 of the automobile (Figure 1).

A bumper guard 20, according to the invention, is secured to the bumper 10 and has a hollow shell construction, being closed on all sides with the exception of the forward side which is open to permit the side walls 22 and 24 thereof to engage the bumper. The bumper guard is elongated in a vertical direction as seen from the rear (Figure 2) and has a triple-tiered configuration as viewed from the side (Figures 3 and 4).

The bumper guard 20 is secured to the bumper 10 by means such as a bolt 26 passing through an aperture 28 in a cross bracket 30 which is secured at its end portions, as by welding, to the inner face of the side walls of the bumper guard. The shank of the bolt 26 also passes through an aperture 32 in the bumper 10 and receives at its threaded end a nut 34 which presses against a fill-out washer 36 disposed about the bolt 26. The washer has a sloping face 38 for contact with the arcuate wall of the bumper.

The side wall 22 (Figure 3) of the bumper guard 20 has a generally arcuate cut-out portion 40 conforming to the contour of the bumper at the point of engagement of the two members. Similarly, the wall 24 (Figure 4) has a cut-out portion 42 having a shape conforming to the contour of the bumper at the point where the bumper guard fits closely over the bumper.

The triple-tiered construction of the bumper guard 20 divides the guard into three sections, an inset top, a rearwardly protruding bottom, and a central section. The top section, generally indicated by the reference numeral 44, has a rounded top 45, closed side walls and a circular window or port hole aperture 46 in its rear wall. The aperture 46 is defined by an inturned peripheral flange 48 providing a rigid window frame reinforcement and a ring-like flaring reflector for a back-up light 50 which is mounted in the upper section 44. The flange 48 also acts as a protective ring preventing accidental breaking of the light.

A bracket 52 is secured, as by welding, between the side walls 22 and 24 of the guard 20 and is provided with an aperture 54 (Figure 4) through which a stud 56 secured to the light 50 is disposed. A nut 58 is threaded on the stud 56 to hold the light in place. The light 50 is provided with suitable electrical wires 60 which are attached to a source of electric current and pass through a grommet 62 disposed in a hole in the stone guard 16.

The middle section of the bumper guard 20 is indicated by the reference numeral 64 and features a vertical rear buffer face portion 66 of preferably rigid V-rib or wedge shape in horizontal cross section.

The lower section 68 is adapted to provide connection to the exhaust duct of an associated automobile and for this purpose has a downwardly sloping bottom wall 70 and a rear wall 72 with a preferably circular port hole aperture 74 therein. A metal sleeve 76 is secured in the chamber defined by the walls of the lower section by means such as a setscrew 78 threaded through the bottom wall 70 and the sleeve 76. The rear end of the sleeve 76 is disposed close to the aperture 74 in the bumper guard 20 and is aligned therewith so that the aperture is substantially a continuation of the passage defined by the sleeve 76. The forward end of the sleeve 76 receives a flexible coupling 80 which is secured to the tail piece (not shown) of the exhaust pipe of the automobile. If desired, the setscrew 78 may be threaded into the end of the flexible coupling 80, or freely disposed in a hole provided therein, or it may merely abut the outer wall of the flexible coupling so as to hold it in place.

From the foregoing description it is seen that there is provided in this invention a novel bumper guard having a plurality of openings accommodating accessories that must be mounted at the rear of an automobile. Further, the novel bumper guard provides supporting means as a unit in itself for mounting the accessories both above and below the bumper. The guard has an open construction which lends itself readily to economical manufacture and has a pleasing appearance in keeping with the design of modern automobiles.

It will, of course, be understood that various details of construction may be varied through a wide range without departing from the principles of the present invention, and it is, therefore, not the purpose to limit the patent granted hereon otherwise than necessitated by the scope of the appended claims.

I claim as my invention:

1. A bumper guard structure for attachment to a vehicle bumper comprising, in combination, an elongated housing shell defining a hollow chamber, spaced apertures in said housing shell, a support bracket disposed within said housing shell, a light mounted on said bracket in alignment with one of said apertures, a cylindrical sleeve secured in said housing having one open end in alignment with the other of said apertures, and the other open end arranged for connection to the end of an exhaust pipe.

2. In combination, a bumper guard having walls defining a hollow chamber, one of said walls having spaced apertures, a light supported in protected position within said chamber in alignment with one of said apertures, a sleeve secured in said chamber in alignment longitudinally with the other of said apertures, and means for securing the end of an exhaust pipe in said sleeve.

3. In combination, a bumper guard having walls defining a hollow chamber, one of said walls having an upper and a lower port hole, said upper port hole being defined by an inturned annular flange providing a reinforcing and protective reflector ring, a light supported in protective position within said chamber in alignment with said upper port hole, a sleeve secured in said chamber in alignment longitudinally with said lower port hole and means for securing the end of an exhaust pipe in said sleeve.

4. A bumper guard adapted for attachment to the rear bumper of an automobile comprising walls defining a chamber, one of said walls having an upper and a lower port hole with a buffer surface therebetween, a portion of the chamber immediately in front of said surface being arranged to receive the bumper therethrough, a bracket in the portion of the chamber in front of said upper port hole adapted to mount a light in alignment with said upper port hole, a cylindrical sleeve secured in the portion of the chamber in front of said lower port hole having an open end in alignment with the lower port hole and the other end arranged to receive in retaining engagement the end of an exhaust pipe.

5. As an article of manufacture, a bumper guard having walls defining an elongated hollow housing, spaced port holes at the upper and lower end portion of one wall of said housing, a support bracket disposed inside said housing adjacent the upper port hole and adapted to support a light in alignment with said upper port hole, a bumper guard mounting bracket on said housing at substantially a central portion of said housing, and means carried by said housing for holding a member in alignment with said lower port hole.

6. As an article of manufacture, a bumper guard having walls defining an elongated hollow housing including means adapting the housing to be attached in upright position on a bumper, the side walls of said housing having bumper-receiving cut-out portions substantially at the central portion thereof, said housing having spaced port holes, one above and one below said central portion of the housing, and means for attaching an exhaust pipe to the lower portion of said housing to discharge through the lower port hole.

7. A bumper guard adapted for attachment to the rear bumper of an automobile, said bumper comprising an upright hollow shell having a rearwardly facing bumper wall and opening forwardly, the forwardly opening portion of the bumper guard being intermediately attachable in upright position on a rear bumper, the upper portion of the shell being inset from the intermediate portion of the bumper wall, and the lower portion of the shell being offset rearwardly from the intermediate portion of the bumper wall, said upper and lower portions having respective rearwardly opening port holes therein, the upper port hole being adapted to have a light mounted within the shell for directing light through said upper port hole, and means on said lower portion of the shell to support an exhaust pipe in discharge relation to the lower port hole.

RICHARD H. ARBIB.

REFERENCES CITED

The following references are of record in the file of this patent:

UNITED STATES PATENTS

| Number | Name | Date |
|---|---|---|
| D. 153,904 | Rygasewicz | May 24, 1949 |
| 1,771,319 | Schmidt | July 22, 1930 |
| 2,104,182 | Best | Jan. 4, 1938 |
| 2,144,167 | Sanders | Jan. 17, 1939 |
| 2,177,968 | Weiss | Oct. 31, 1939 |
| 2,231,312 | Ache | Feb. 11, 1941 |
| 2,260,578 | Murray | Oct. 28, 1941 |
| 2,308,094 | Mears | Jan. 12, 1943 |